US009471572B1

(12) United States Patent
Vassilvitskii et al.

(10) Patent No.: US 9,471,572 B1
(45) Date of Patent: Oct. 18, 2016

(54) RECOMMENDING CANDIDATES FOR CONSUMPTION

(71) Applicant: Google Inc., Mountain View, CA (US)

(72) Inventors: Sergei Vassilvitskii, San Francisco, CA (US); Andrew Tomkins, Menlo Park, CA (US); Shanmugasundaram Ravikumar, Berkeley, CA (US); Ashton Anderson, San Francisco, CA (US)

(73) Assignee: Google Inc., Mountain View, CA (US)

(*) Notice: Subject to any disclaimer, the term of this patent is extended or adjusted under 35 U.S.C. 154(b) by 225 days.

(21) Appl. No.: 14/145,383

(22) Filed: Dec. 31, 2013

(51) Int. Cl.
*G06F 17/30* (2006.01)

(52) U.S. Cl.
CPC .............. *G06F 17/30038* (2013.01)

(58) Field of Classification Search
None
See application file for complete search history.

(56) References Cited

U.S. PATENT DOCUMENTS

| | | | |
|---|---|---|---|
| 6,412,012 B1* | 6/2002 | Bieganski | G06Q 30/02 709/232 |
| 8,135,718 B1* | 3/2012 | Das | G06F 17/30979 707/748 |
| 8,306,976 B2 | 11/2012 | Handman et al. | |
| 8,903,834 B2 | 12/2014 | Ciancutti et al. | |
| 2007/0078849 A1* | 4/2007 | Slothouber | G06F 17/30867 |
| 2009/0055396 A1* | 2/2009 | Svendsen | G11B 27/00 707/999.007 |
| 2009/0327913 A1 | 12/2009 | Adar et al. | |
| 2010/0290518 A1* | 11/2010 | Lee | H04N 19/597 375/240.01 |
| 2012/0110135 A1* | 5/2012 | Sparks | G06F 17/30286 709/219 |
| 2013/0179439 A1 | 7/2013 | Handman et al. | |
| 2014/0279196 A1* | 9/2014 | Wilson | G06Q 30/0631 705/26.7 |

OTHER PUBLICATIONS

Papadakis, George, et al. "A Layered Approach to Revisitation Prediction." Web Engineering. Springer Berlin Heidelberg, 2011, pp. 258-273.
Jacoby, Jacob, and David B. Kyner. "Brand Loyalty vs. Repeat Purchasing Behavior." Journal of Marketing research (1973): pp. 1-9.
Bass, Frank M. "The Theory of Stochastic Preference and Brand Switching." Journal of Marketing Research (1974): pp. 1-20.
McAlister, Leigh. "A Dynamic Attribute Satiation Model of Variety-Seeking Behavior." Journal of Consumer Research (1982): 141-150.
McAlister, Leigh, and Edgar Pessemier. "Variety Seeking Behavior: An Interdisciplinary Review." Journal of Consumer Research (1982): pp. 311-322.
Bass, Frank M., et al. "An Investigation Into the Order of the Brand Choice Process." Marketing Science 3.4 (1984): pp. 267-287.

(Continued)

*Primary Examiner* — Yuk Ting Choi
(74) *Attorney, Agent, or Firm* — Middleton Reutlinger (57) ABSTRACT

Methods and apparatus are described herein for recommending candidates for consumption. A first set of one or more candidates for first time consumption by a user and associated utility scores may be identified. A second set of one or more candidates for reconsumption by the user may be determined. Utility scores of the second set of one or more candidates for reconsumption may be determined based on consumption history of the user and aggregate consumption history of a population of users of which the user is associated. A candidate to be recommended to the user for consumption may be selected from the first or second set. The candidate may be selected based at least in part on the utility scores of the first and second sets.

13 Claims, 5 Drawing Sheets

(56) References Cited

OTHER PUBLICATIONS

Kahn, Barbara E., Manohar U. Kalwani, and Donald G. Morrison. "Measuring Variety-Seeking and Reinforcement Behaviors Using Panel Data." Journal of Marketing Research (1986): pp. 89-100.
Bawa, Kapil. "Modeling Inertia and Variety Seeking Tendencies in Brand Choice Behavior." Marketing Science (1990): pp. 263-278.
Ratner, Rebecca K., Barbara E. Kahn, and Daniel Kahneman. "Choosing Less-Preferred Experiences for the Sake of Variety." Journal of Consumer Research 26.1 (1999): pp. 1-15.
Dorogovtsev, S. N., and J. F. F. Mendes. "Evolution of Reference Networks with Aging." arXiv preprint cond-mat/0001419 (2000), 5 pages.
Kumar, Ravi, et al. "Stochastic Models for the Web Graph," Proceedings of the 41st Annual Symposium on Foundations of Computer Science, IEEE Computer Society, 2000, 9 pages.
Teevan, Jaime, et al. "History Repeats Itself: Repeat Queries in Yahoo's Logs." Proceedings of the 29th Annual International ACM SIGIR Conference on Research and Development in Information Retrieval. ACM, 2006, 2 pages.
Teevan, Jaime, et al. "Information Re-Retrieval: Repeat Queries in Yahoo's Logs." Proceedings of the 30th Annual International ACM SIGIR Conference on Research and Development in Information Retrieval. ACM, 2007, 8 pages.
Cohen, Jonathan D., Samuel M. McClure, and J. Yu Angela. "Should I Stay or Should I Go? How the Human Brain Manages the Trade-Off Between Exploitation and Exploration." Philosophical Transactions of the Royal Society B: Biological Sciences 362.1481 (2007): pp. 933-942.
Adar, Eytan, Jaime Teevan, and Susan T. Dumais. "Large Scale Analysis of Web Revisitation Patterns." Proceedings of the SIGCHI Conference on Human Factors in Computing Systems. ACM, 2008, 10 pages.
Adar, Eytan, Jaime Teevan, and Susan T. Dumais. "Resonance on the Web: Web Dynamics and Revisitation Patterns." Proceedings of the SIGCHI Conference on Human Factors in Computing Systems. ACM, 2009, 10 pages.
Tyler, Sarah K., and Jaime Teevan. "Large Scale Query Log Analysis of Re-Finding." (2010), 11 pages. http://people.csail.mit.edu/teevan/work/publications/papers/wsdm10.pdf.
Das Sarma, Anish, et al. "Understanding Cyclic Trends in Social Choices." Proceedings of the Fifth ACM International Conference on Web Search and Data Mining. ACM, 2012, 9 pages.
Wierenga, Berend. An Investigation of Brand Choice Processes. Rotterdam School of Management (RSM), Erasmus University, 1974, 282 pages.
Kawase, Ricardo, et al. "Beyond the Usual Suspects: Context-Aware Revisitation Support." Proceedings of the 22nd ACM conference on Hypertext and hypermedia. ACM, 2011, 10 pages.

\* cited by examiner

RECOMMENDING CANDIDATES FOR CONSUMPTION

BACKGROUND

Users may consume items based on recommendations received from various sources. For example, a user may provide a streaming music application with various signals (e.g., preferred artist, like/dislike of particular songs, etc.) indicative of her taste in music. Based on these signals, the streaming music application may recommend a next song for the user to listen to. As another example, when a user watches a video on a video streaming website, the video streaming website may, based on various signals related to the user or the video she watched, recommend other videos to the user, e.g., in the margin around the video player. As yet another example, a map application on a mobile device may recommend a nearby restaurant to a user based on various signals, such as cuisines and/or price points preferred by the user.

SUMMARY

The present disclosure is generally directed to methods, apparatus and computer-readable media (transitory and non-transitory) for recommending "candidates for consumption"—e.g., songs, videos, restaurants, etc. (also referred to as "items")—to a user. An application (e.g., music streaming application, map application, video viewer) may determine that a user desires to consume a particular type of item (e.g., song, video, restaurant, etc.). For instance, a user may have finished listening to one song and may be awaiting playback of another recommended song. Or, the user may request a recommendation for a restaurant nearby. The application may identify, e.g., in a first set of candidates to be recommended for consumption, candidates for "first time consumption"—e.g., songs, videos, restaurants, etc. that the user has never before "consumed." The system may also determine, as a second set of candidates for recommendation for consumption, candidates for "reconsumption"—e.g., songs videos, restaurants, etc. that the user has consumed previously. "Utility scores"—any quantization of a level of usefulness, utility or value a user is predicted to realize from consuming a particular item—may be determined for candidates of the first and second sets. Utility scores (of the second set) of candidates for reconsumption may also be based on "reconsumability" and/or "locality" metrics. The candidate ultimately selected for recommendation to the user may be selected from first and second sets based on the utility scores.

In some implementations, a computer implemented method may be provided that includes the steps of: identifying, by a computing system, a first set of one or more candidates for first time consumption by a user and associated utility scores; determining, by the computing system, a second set of one or more candidates for reconsumption by the user; determining, by the computing system, utility scores of the second set of one or more candidates for reconsumption based on consumption history of the user and aggregate consumption history of a population of users of which the user is associated; and selecting, by the computing system, a candidate to be recommended to the user for consumption from the first or second set, the candidate selected based at least in part on the utility scores of the first and second sets.

This method and other implementations of technology disclosed herein may each optionally include one or more of the following features.

The method may further include calculating, by the computing system, the utility scores associated with the one or more candidates for reconsumption based at least in part on localities of the one or more candidates for reconsumption. In some implementations, the localities of the one or more candidates for reconsumption are based on a number of consumption iterations by the user since the candidate was last consumed by the user. In some implementations, the localities of the one or more candidates for reconsumption are based on weights assigned to past consumption iterations.

In some implementations, the method may further include determining, by the computing system, the weights to assign to the past consumption iterations based at least in part on a consumption type shared by the one or more candidates for reconsumption. In some implementations, the method may further include determining, by the computing system, the weights to assign to the past consumption iterations based at least in part on aggregate consumption history of the population of users of items having the consumption type. In some implementations, the method may further include determining, by the computing system, the weights to assign to the past consumption iterations based at least in part on consumption history of the user of items sharing the consumption type.

In some implementations, the method may further include calculating, by the computing system, the utility scores associated with the one or more candidates for reconsumption based at least in part on reconsumability of the candidates for reconsumption. In some implementations, the method may further include determining, by the computing system, reconsumability of a candidate of the second set for reconsumption based on a popularity of the candidate among the population of users. In some implementations, reconsumability of the candidate of the second set for reconsumption is further based on a reconsumption rate of the candidate in relation to the popularity of the candidate. In some implementations, the utility scores are calculated further based on localities of the one or more candidates for reconsumption.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
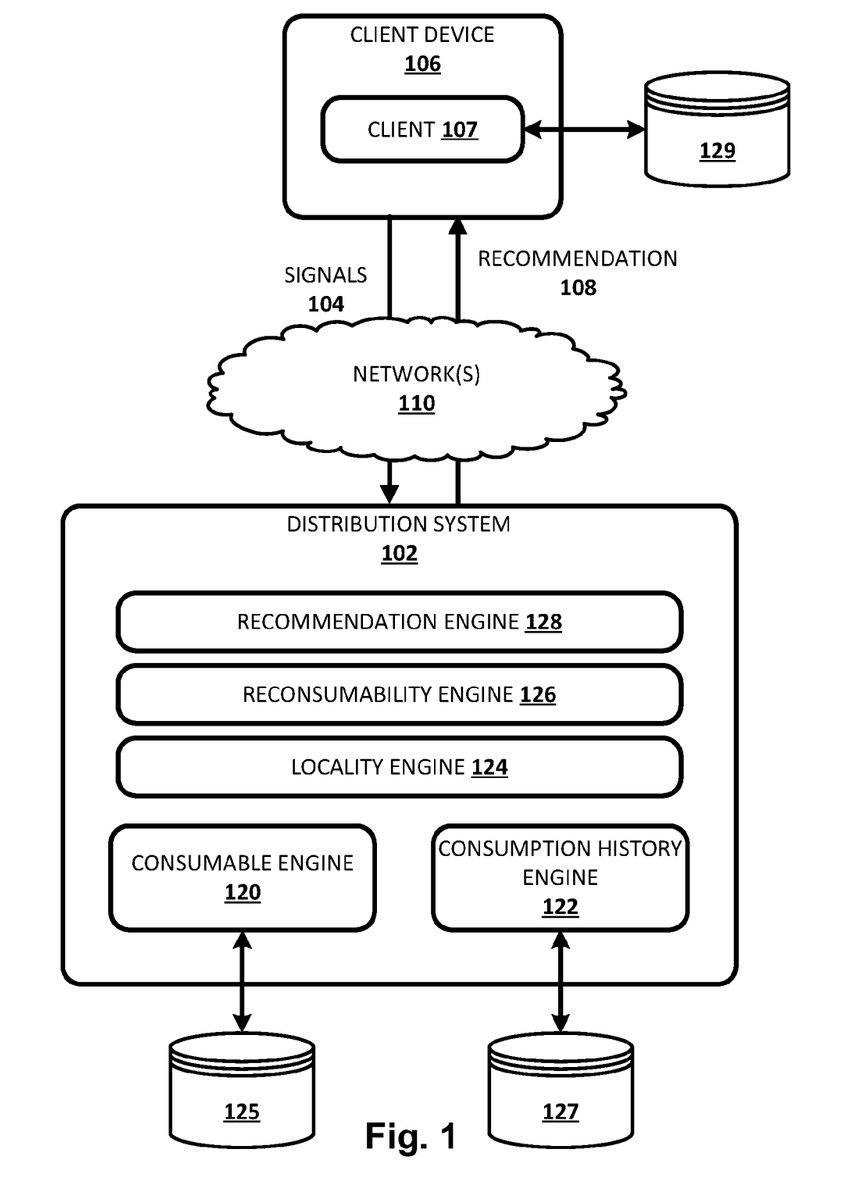
FIG. 1 illustrates an example environment in which a user may be recommended candidates for consumption.

FIG. 1 illustrates an example environment in which candidates for consumption may be recommended to a user. The example environment includes a client device 106 and a consumable distribution system 102 (hereinafter referred to as "distribution system 102"). Distribution system 102 may be implemented in one or more computers that communicate, for example, through a network (not depicted). Distribution system 102 may be an example of a system in which the systems, components, and techniques described herein may be implemented and/or with which systems, components, and techniques described herein may interface.

A user may interact with distribution system 102 via client device 106. Distribution system 102 may receive one or more signals 104 from the client device 106 and may return one or more recommendations 108 in response to the signals 104. Other computer devices may submit signals to distribution system 102 such as additional client devices and/or one or more servers implementing a service for a website that has partnered with the provider of distribution system 102. For brevity, however, the examples are described in the context of client device 106.

Client device 106 may be a computer in communication with distribution system 102 through a network such as a local area network (LAN) or wide area network (WAN) such as the Internet (one or more such networks indicated generally at 110). Client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a wearable music player). Additional and/or alternative client devices may be provided.

Client device 106 may execute one or more applications that enable a user to receive recommendations of candidates for consumption. For example, the client device 106 may execute one or more client applications 107 that allow users to receive recommendations of various types of candidates for consumption, including but not limited to music, movies, textual content (e.g., E-books), restaurants, bars, activities, events, and so forth. In some implementations, client application 107 may further enable a user to consume some types of items. For example, client application 107 may be a music streaming application that enables a user to listen to music, or a web browser that enables a user to listen to music, watch videos, or consume other types of content. In other implementations, client application 107 may be a map application that a user may use to obtain recommendations for restaurants, bars, events, and so forth.

In some implementations, client device 106 and distribution system 102 each include memory for storage of data and software applications, a processor for accessing data and executing applications, and components that facilitate communication over network 110. The operations performed by client device 106 and/or distribution system 102 may be distributed across multiple computer systems. Distribution system 102 may be implemented as, for example, computer programs running on one or more computers in one or more locations that are coupled to each other through a network.

In various implementations, distribution system 102 may include a consumable engine 120, a consumption history engine 122, a locality engine 124, a reconsumability engine 126, and/or a recommendation engine 128. In some implementations one or more of engines 120, 122, 124, 126 and/or 128 may be combined and/or omitted. In some implementations, one or more of engines 120, 122, 124, 126 and/or 128 may be implemented in a component that is separate from distribution system 102. In some implementations, one or more of engines 120, 122, 124, 126 and/or 128, or any operative portion thereof, may be implemented in a component that is executed by client device 106.

Consumable engine 120 may maintain an index 125 of consumables for distribution by distribution system 102. Consumable engine 120 may use conventional and/or other indexing techniques. Consumables may include but are not limited to music, web pages, text documents (e.g., E-books), videos, web feeds, restaurants, bars, dance halls, clubs, stores, sporting destinations, and events, to name just a few.

Consumption history engine 122 may optionally maintain, for use by distribution system 102, another index 127 that includes or facilitates access to information about prior consumption of consumables maintained in index 125. For example, one or more components of distribution system 102 may utilize consumption history information contained in index 127 to determine one or more consumables from index 125 to recommend to a user for consumption.

In some implementations, client device 106, e.g., by way of client application 107, may maintain, in an index 129, data related to consumption history of client device 106 and/or a user of client device 106. In some implementations, index 129 may include data about items previously consumed using client device 106. In some implementations, index 129 may include data about items previously consumed by a user of client device 106, independent of client device 106. Consumption history data in index 129 may include but is not limited to data about previously-consumed items themselves (e.g., a ranking of the item by a user of client device 106, metadata, type of cuisine, etc.), when the item was consumed, how many consumption iterations have elapsed since the item was consumed, and so forth. In some implementations, client device 106 may make data from index 129 available, e.g., as signals 104, for use by distribution system 102 to recommend items for consumption.

In this specification, the term "database" and "index" will be used broadly to refer to any collection of data. The data of the database and/or the index does not need to be structured in any particular way and it can be stored on storage devices in one or more geographic locations. Thus, for example, the indices 125, 127 and/or 129 may include multiple collections of data, each of which may be organized and accessed differently.

As used herein, a "consumption iteration" refers to an instance of a particular user consuming, or a particular client device 106 being used to consume, an item of a particular type. For instance, if index 129 indicates that a user has listened to songs one hundred times, twenty four consumption iterations have elapsed since the user listened to a song for the seventy fifth time. If index 129 indicates that a user has eaten out at restaurants ten times, then nine consumption iterations have elapsed since the user ate out at a restaurant for the first time. A consumption iteration is characterized by a particular type of item, not by a particular item. Hence, the same item may be consumed and reconsumed in separate consumption iterations. For instance, in the restaurant example, the user may have eaten out ten times, but may have eaten at less than ten unique restaurants.

Locality engine 124 may be configured to determine one or more "locality" metrics associated with a user and/or candidates for (re)consumption. Reconsumability engine 126 may be configured to determine one or more "reconsumability" metrics of one or more candidates for consumption. "Locality" and "reconsumability" metrics will be described further below with regard to method 200 of FIG. 2.

Recommendation engine 128 may, in some implementations, determine utility scores of candidates for reconsumption based on one or more locality metrics determined by locality engine 124 and/or one or more reconsumability metrics determined by reconsumability engine 126. Recommendation engine 128 may then select, e.g., from a set of candidates for first time consumption and a set of candidates for reconsumption based on utility scores, a candidate to be recommended to a user.

Figure 2:
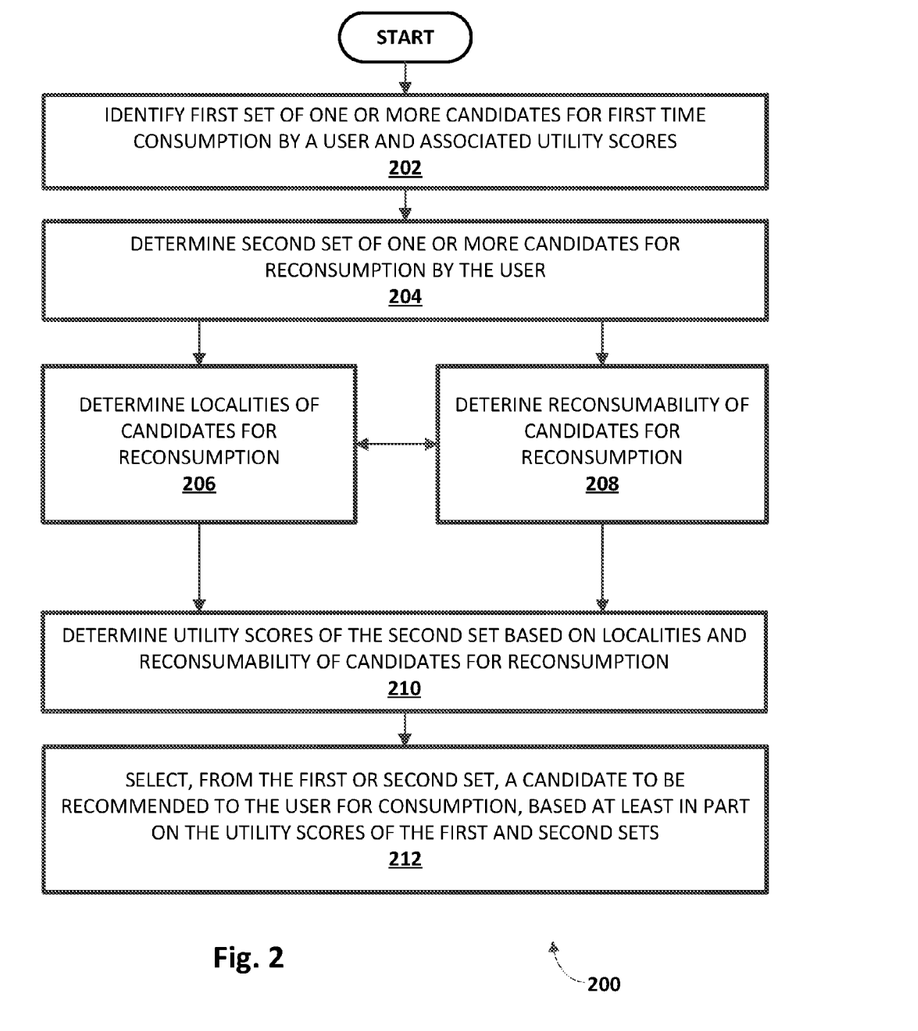
FIG. 2 is a flow chart illustrating an example method of recommending candidates for consumption.

Referring now to FIG. 2, an example method 200 of recommending candidates for consumption is described. For convenience, the operations of the flow chart are described with reference to a system that performs the operations. This system may include various components of various computer systems. For instance, some operations may be performed at the client device 106, while other operations may be performed by one or more components of the distribution system 102, such as consumable engine 120, consumption history engine 122, locality engine 124, reconsumability engine 126, and/or recommendation engine 128. Moreover, while operations of method 200 are shown in a particular order, this is not meant to be limiting. One or more operations may be reordered, omitted or added.

Method 200 may begin ("START") when the time comes to make a recommendation to a user of an item to consume. For instance, a user may request, e.g., from client application 107, a recommendation for a restaurant nearby. As another example, client application 107 may be a streaming music application, and a user may be about to finish consuming a song. At that point, client application 107 may be configured to recommend, or automatically begin playing after the current song completes, the next song. As yet another example, client application 107 may be a standalone video viewer or a web browser with an integrated video viewer, and a user may be watching or about to complete watching a video. Client application 107 may be configured to recommend other videos to the user, e.g., in a margin around the video viewer or within the video viewer after completion of the video.

At block 202, the system may identify a first set that includes one or more candidates for first time consumption by a user, as well as utility scores associated with those candidates for consumption. For instance, assume a user is about to complete consumption of a song. The system may identify, e.g., based on various characteristics of the user (e.g., general musical tastes), the song she is about to finish, or other signals, one or more candidate songs that the user has not previously consumed (e.g., at least to the system's knowledge) that are predicted to be useful or desirable to the user. The system may quantify how useful or desirable or desirable those candidate songs with associated utility scores. In the context of new items never before consumed by the user, the utility scores may be based on general popularity of the items, popularity of the items in a population of users similar to the user, closeness of the items to items the user has previously found to be highly useful (or not useful), and so forth.

At block 204, the system may determine a second set that includes one or more candidates for reconsumption by the user. For instance, the system may query index 129 for songs that the user has previously listened to or restaurants the user visited previously. In some implementations, such a query may be limited to a certain time frame (e.g., in the last twelve months), the last x consumption iterations, or in other ways.

At block 206, the system may determine one or more locality metrics of the candidates for reconsumption determined at block 204. "Locality" metrics may include metrics related to how recently the user previously consumed a particular candidate for reconsumption. In various implementations, each past consumption iteration may be assigned a weight to be used when calculating utility scores of candidates for reconsumption.

For example, in various implementations, the system may determine weights to assign to the past consumption iterations based at least in part on a consumption type shared by the candidates for reconsumption. Different weights may be assigned to past consumption iterations when the consumption type is "song," as opposed to "video" or "restaurant," because, for instance, a user may be more likely to reconsume a song she previously consumed two consumption iterations ago than she would be to revisit a restaurant she previously consumed two consumption iterations ago (consuming a song typically requires less investment in time/money/effort than consuming a restaurant).

As another example, take a list of the last ten restaurants frequented by the user. Various metrics relating to restaurants, such as how likely in general users are to revisit that particular restaurant or a particular type of restaurant (bar, ethnic cuisine, etc.) within x consumption iterations of last having eaten there, may be used to determine weights to assign to each of the list of ten restaurants previously visited by the user. In some implementations, one or more reconsumability metrics (described below) also may be used to determine the weights, or to determine utility scores based on the weights.

In various implementations, the system may determine weights to assign to the past consumption iterations based at least in part on aggregate consumption history (e.g., from index 127) of the population of users of items having the consumption type. For instance, aggregate consumption history may reveal that most users tend to attain greater value from revisiting a restaurant that was previously visited more than three weeks ago than a restaurant that was visited less than three weeks ago (e.g., due to burnout of that particular restaurant). As another example, aggregate consumption history may reveal that most users tend to attain greater value from reconsuming a comedy video that was previously consumed less than ten comedy video consumption iterations ago than another that was consumed more than ten comedy video consumption iterations ago (e.g., comedy videos may become stale to users quickly).

In addition to aggregate consumption history, in various implementations, the system may determine weights to assign to the past consumption iterations based at least in part on consumption history of the user of items sharing the consumption type. For instance, the user's consumption history (e.g., from index 129) may reveal a penchant for frequenting the same restaurant in bursts (e.g., five times in a row, then not for some time, then four times in a row again). The system may take these burst patterns into account when assigning weights to past consumption iterations.

In some implementations, the system may employ an Expectation-Maximization (EM) algorithm to assign a set of weights, $w_1, w_2, w_3, \ldots, w_n$, to a set of prior consumption iterations. Let $x_t$ denote the item selected at time t, and $y_j^t$ denote which of the previous consumption iterations $x_t$ was copied from. Assume also that $y_j^t \propto w_j$. For a maximization step, the system may attempt to determine the set of weights, $w_1, w_2, w_3, \ldots, w_n$, that maximize the expected log likelihood. Consider all events $\epsilon$ where the item consumed has been consumed previously. The system may use the following equation to determine a contribution $c_j^t$ a given event $\epsilon_t$ makes to each weight j:

$$c_j^t = \begin{cases} \dfrac{y_j^t}{\sum_{k<t:x_k=x_t} y_k^t}, & \text{if } x_t = x_{t-j} \\ 0, & \text{otherwise} \end{cases}$$

Then, the system may compute new weights, e.g., using an equation such as the following:

$$w_j^{new} = \frac{\sum_t c_j^t}{\sum_{t,j} c_j^t}$$

The system may, in some implementations, initialize the weights to be equal; in such case, it may be the relative magnitude of the weights that governs the result. Then system may then repeat calculations described above until the weights converge.

Referring back to FIG. 2, at block 208, the system may determine one or more reconsumability metrics of the candidates for reconsumption. "Reconsumability" metrics may include metrics such a general popularity of a particular candidate for reconsumption (e.g., how many times consumed), as well as how often the item is reconsumed by users in general (e.g., unique users/total times consumed). A popular item that is not often reconsumed by the public (or by a population of users with which the user is associated) may indicate that the item is something that many users tend to consume once, but not again, and thus may receive a relatively low reconsumability score. Conversely, a somewhat less popular item that is reconsumed often may receive a higher reconsumability score. An item that is both popular and reconsumed often may receive a relatively high reconsumability score. In some cases, if user does not tend to attain much value out of reconsuming things—e.g., she prefers new restaurants every time—then her candidates for reconsumption may receive relatively low reconsumability scores across the board.

In some implementations, given a set of events, the system may determine a maximum likelihood score as proportional to an overall popularity of an item. For example, given a consumption sequence $x_1, x_2, \ldots, x_n$, the maximum likelihood scores s, may be calculated by the system using an equation such as the following:

$$s_i = \frac{1}{n} \sum_{j:x_j=1} 1$$

In some implementations, and as indicated by the double-headed arrow between blocks 206 and 208, the system may use reconsumability metrics to determine locality metrics, and vice versa. For example, items associated with a series of prior consumption iterations may have various reconsumability values or scores associated with them. The system may take those reconsumability values or scores into account when assigning weights to those past consumption iterations.

Based on the locality and reconsumability metrics determined at blocks 206-208, the system may determine utility scores of the candidates for reconsumption determined at block 204. These utility scores may be calculated in various ways, such as by multiplying a weight by a reconsumability score.

At block 212, the system may select a candidate to be recommended for consumption to the user from the first or second set, e.g., based on the utility scores determined at blocks 202 and 210. Depending on the nature of the user's operation of client device 106—e.g., whether client application 107 is a music streaming player looking for a next song to play, a video player application looking for a video to recommend, a map application looking for a restaurant to recommend to the user, etc.—the system may recommend and/or facilitate transition of the selected candidate to the user.

Figure 3A:
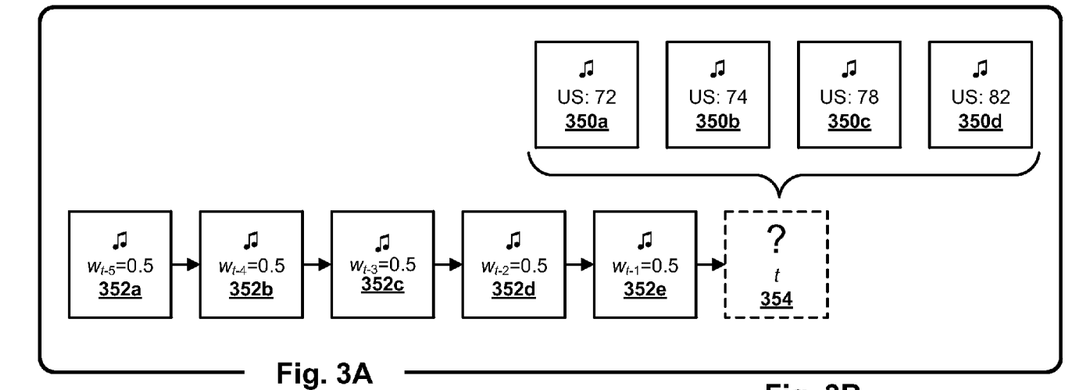
FIGS. 3A-D schematically demonstrate an example of how disclosed techniques may be implemented to recommend a candidate song for consumption.

FIGS. 3A-D schematically demonstrate one example of how disclosed techniques may be implemented to recommend a candidate song for consumption. Songs are used for illustrative purposes only. Similar techniques may be used for video, restaurants, or other types of consumables. In FIG. 3A, a first set of candidate songs for first time consumption, 350a-d, have been identified, e.g., by recommendation engine 128, along with their associated utility scores ("US"). A first candidate song for first time consumption 350a has a utility score of 72. A second candidate song for first time consumption 350b has a utility score of 74. A third candidate song for first time consumption 350c has a utility score of 78. A fourth candidate song for first time consumption 350d has a utility score of 82. In this example, utility scores range from zero to one hundred, but this range was selected for illustrative purposes only, and is not meant to be limiting.

A second set that includes candidates for reconsumption 352a-e has also been determined, e.g., by recommendation engine 128 based on information contained in index 129. In this example, each candidate for reconsumption has been assigned a default weight of 0.5. These candidates for reconsumption 352a-e represent five previous consumption iterations, t−5, t−4, . . . , t−1. The next consumption iteration, for which a next song is to be recommended, is designated 354, and will occur at a present consumption iteration t. The next song 354 may be selected from the first set 350 containing candidates for first time consumption or the second set 352 containing candidates for reconsumption, e.g., based on utility scores of the respective candidates.

Figure 3B:
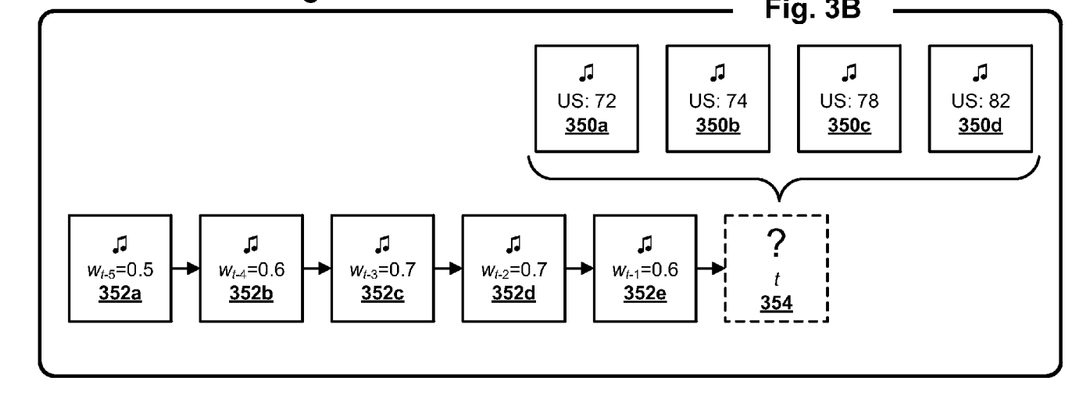

In FIG. 3B, aggregate user consumption history has been used, e.g., by locality engine 124, to determine weights for the candidates for reconsumption 352a-e. First candidate for reconsumption 352a has been assigned the weight 0.5. Second candidate for reconsumption 352b has been assigned the weight 0.6. Third candidate for reconsumption 352c and fourth candidate for reconsumption 352d have both been assigned the weight 0.7. Fifth candidate for reconsumption 352e has been assigned the weight 0.6. These weights indicate that users in general are likely to derive more value from reconsuming songs last consumed at past consumption iterations t−3 and t−2 than other past consumption iterations.

Figure 3C:
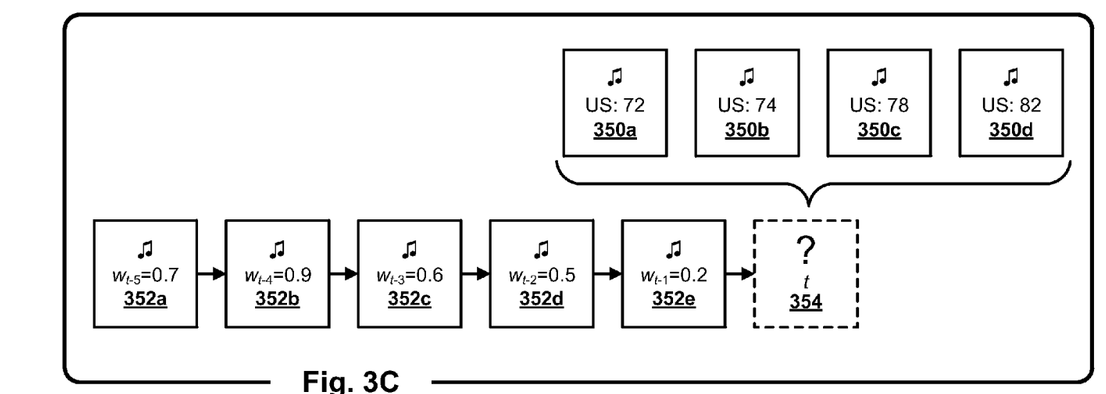

In FIG. 3C, user consumption history for the specific user has been used, e.g., by locality engine 124, to modify the weights for the candidates for reconsumption 352*a-e*. Although this operation is depicted as occurring after the operation shown in FIG. 3B, this is not meant to be limiting. These operations may be performed in the reverse order, as well. First candidate for reconsumption 352*a* has been assigned a recalculated weight of 0.7. Second candidate for reconsumption 352*b* has been assigned a recalculated weight of 0.9. Third candidate for reconsumption 352*c* has been assigned a recalculated weight of 0.6. Fourth candidate for reconsumption 352*d* has been assigned a recalculated weight of 0.5. Fifth candidate for reconsumption 352*e* has been assigned a recalculated weight of 0.2. These recalculated weights indicate that the specific user is likely to derive the most value from reconsuming a song last consumed at past consumption iteration t−4, and very unlikely to derive much value from immediately reconsuming the last-consumed song, 352*e*.

Figure 3D:
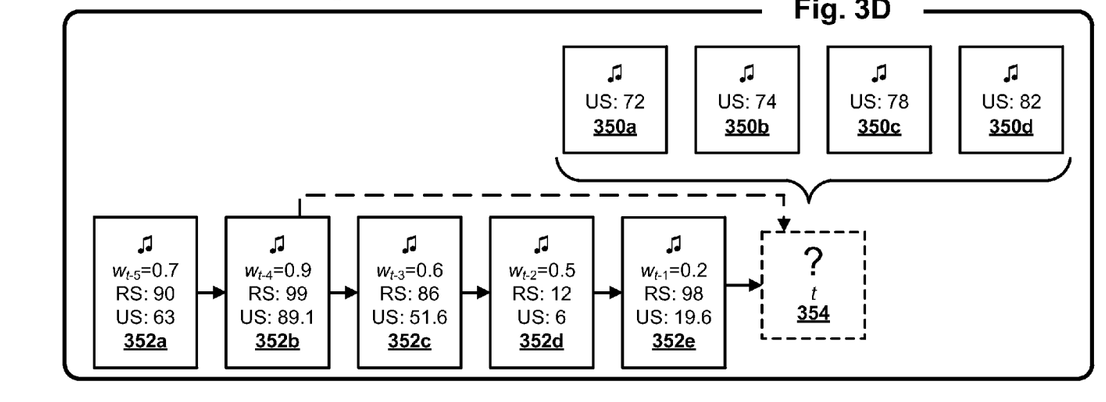

In FIG. 3D, reconsumability scores ("RS") have been computed, e.g., by reconsumability engine 126, for the candidates for reconsumption 352*a-e*. As noted above, reconsumability scores may be computed based on various information, such as general popularity of a song, reconsumption rate of the song (alone and in combination with the song's popularity), and so forth. In this example, reconsumability scores range from zero to one hundred, but this range was selected for illustrative purposes only, and is not meant to be limiting. First candidate for reconsumption 352*a* has received a reconsumability score of 90. Second candidate for reconsumption 352*b* has received a reconsumability score of 99. Third candidate for reconsumption 352*c* has received a reconsumability score of 86. Fourth candidate for reconsumption 352*d* has received a reconsumability score of 12. Fifth candidate for reconsumption 352*e* has received a reconsumability score of 98. These reconsumability scores indicate that candidates for reconsumption 352*b* and 352*e* are much more likely than others to provide users with value when reconsumed. Fifth candidate for reconsumption 352*e*, on the other hand, apparently is very unlikely to provide value if reconsumed (e.g., it is unpopular, not often reconsumed, or both).

Based on the reconsumability scores and the weights, the system has calculated utility scores ("US") for the candidates for reconsumption 352*a-e* in FIG. 3D. In this example, the utility score is simply the product of the weight and the reconsumability score. However, this is not meant to be limiting, and other more complex algorithms may be implemented instead. First candidate for reconsumption 352*a* has received a utility score of 63. Second candidate for reconsumption 352*b* has received a utility score of 89.1. Third candidate for reconsumption 352*c* has received a utility score of 51.6. Fourth candidate for reconsumption 352*d* has received a utility score of 6. Fifth candidate for reconsumption 352*e* has received a utility score of 19.6. As indicated by the dashed arrow, second candidate for reconsumption 352*b* may be selected to be recommended to the user for consumption because its utility score (89.1) is greater than the highest utility score of the first set containing candidates for first time consumption (350*d* has a utility score of 82).

Figure 4:
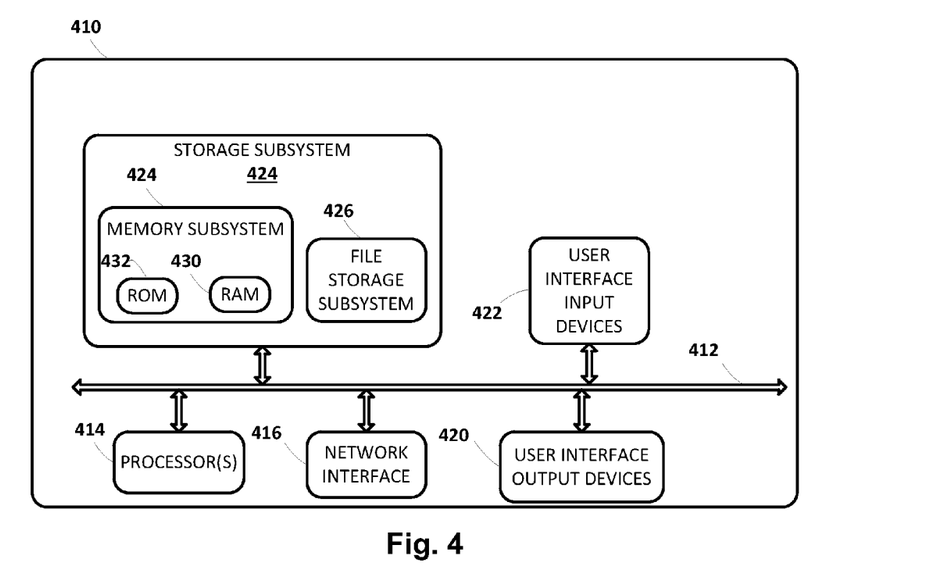
FIG. 4 illustrates an example architecture of a computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 200 and/or to implement one or more of consumable engine 120, consumption history engine 122, locality engine 124, reconsumability engine 126, and/or recommendation engine 128.

These software modules are generally executed by processor 414 alone or in combination with other processors. Memory 425 used in the storage subsystem can include a number of memories including a main random access memory (RAM) 430 for storage of instructions and data during program execution and a read only memory (ROM) 432 in which fixed instructions are stored. A file storage subsystem 424 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 424 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
identifying, by a computing system, a consumption category to be recommended to a user for consumption;
identifying, by the computing system, a first set of one or more candidates for first time consumption by a user and associated utility scores, wherein the one or more candidates for first time consumption share the consumption category;
determining, by the computing system, a second set of one or more candidates for reconsumption by the user, wherein the one or more candidates for reconsumption share the consumption category;
determining, by the computing system, utility scores of the second set of one or more candidates for reconsumption based on localities of the one or more candidates for reconsumption and aggregate consumption history of a population of users of which the user is associated; and
selecting, by the computing system, a candidate to be recommended to the user for consumption from the first or second set, the candidate selected based at least in part on the utility scores of the first and second sets;
wherein the locality of each of the one or more candidates for reconsumption is based on a number of consumption iterations in a sequence of consumption iterations by the user of items sharing the consumption category since the candidate was last consumed by the user, and wherein each consumption iteration in the sequence is weighted based on its position within the sequence.

2. The computer-implemented method of claim 1, further comprising determining, by the computing system, weights to assign to the past consumption iterations based at least in part on the consumption category.

3. The computer-implemented method of claim 2, further comprising determining, by the computing system, the weights to assign to the past consumption iterations based at least in part on aggregate consumption history of the population of users of items having the consumption category.

4. The computer-implemented method of claim 2, further comprising determining, by the computing system, the weights to assign to the past consumption iterations based at least in part on consumption history of the user of items sharing the consumption category.

5. The computer-implemented method of claim 1, further comprising calculating, by the computing system, the utility scores associated with the one or more candidates for reconsumption based at least in part on reconsumability of the candidates for reconsumption.

6. The computer-implemented method of claim 5, further comprising determining, by the computing system, reconsumability of a candidate of the second set for reconsumption based on a popularity of the candidate among the population of users.

7. The computer-implemented method of claim 6, wherein reconsumability of the candidate of the second set for reconsumption is further based on a reconsumption rate of the candidate in relation to the popularity of the candidate.

8. A system comprising:
memory; and
one or more processors operably coupled to the memory and configured to execute instructions stored in the memory to perform the following operations:
identify a consumption category to be recommended to a user for consumption;
identify a first set of one or more candidates for first time consumption by a user and associated utility scores, wherein the one or more candidates for first time consumption share the consumption category;
determine a second set of one or more candidates for reconsumption by the user, wherein the one or more candidates for reconsumption share the consumption category;
determine utility scores of the second set of one or more candidates for reconsumption based on localities of the one or more candidates for reconsumption and aggregate consumption history of a population of users of which the user is associated; and
select a candidate to be recommended to the user for consumption from the first or second set, the candidate selected based at least in part on the utility scores of the first and second sets;
wherein the locality of each of the one or more candidates for reconsumption is based on a number of consumption iterations in a sequence of consumption iterations by the user of items sharing the consumption category since the candidate was last consumed by the user, and wherein each consumption iteration in the sequence is weighted based on its position within the sequence.

9. The system of claim 8, wherein the memory further stores instructions to determine weights to assign to the past consumption iterations based at least in part on the consumption category.

10. The system of claim 9, wherein the memory further stores instructions to determine the weights to assign to the past consumption iterations based at least in part on aggregate consumption history of the population of users of items having the consumption category.

11. The system of claim 9, wherein the memory further stores instructions to determine the weights to assign to the past consumption iterations based at least in part on consumption history of the user of items sharing the consumption category.

12. The system of claim 8, wherein the memory further stores instructions to calculate the utility scores associated with the one or more candidates for reconsumption based at least in part on reconsumability of the candidates for reconsumption.

13. A non-transitory computer readable storage medium storing computer instructions executable by a processor to perform a method comprising:

identifying a consumption category to be recommended to a user for consumption identifying a first set of one or more candidates for first time consumption by a user and associated utility scores, wherein the one or more candidates for first time consumption share the consumption category;

determining a second set of one or more candidates for reconsumption by the user, wherein the one or more candidates for reconsumption share the consumption category;

determining utility scores of the second set of one or more candidates for reconsumption based on localities of the one or more candidates for reconsumption and aggregate consumption history of a population of users of which the user is associated; and selecting a candidate to be recommended to the user for consumption from the first or second set, the candidate selected based at least in part on the utility scores of the first and second sets;

wherein the locality of each of the one or more candidates for reconsumption is based on a number of consumption iterations in a sequence of consumption iterations by the user of items sharing the consumption category since the candidate was last consumed by the user, and wherein each consumption iteration in the sequence is weighted based on its position within the sequence.

* * * * *